(12) United States Patent
Sakakibara

(10) Patent No.: US 6,278,261 B1
(45) Date of Patent: Aug. 21, 2001

(54) BATTERY CHARGING DEVICE AND CHARGING METHOD THEREOF

(75) Inventor: Kazuyuki Sakakibara, Anjo (JP)

(73) Assignee: Makita Corporation (JP)

( * ) Notice: Subject to any disclaimer, the term of this patent is extended or adjusted under 35 U.S.C. 154(b) by 0 days.

(21) Appl. No.: 09/710,411

(22) Filed: Nov. 9, 2000

(30) Foreign Application Priority Data

Nov. 10, 1999 (JP) .................................................. 11-319677

(51) Int. Cl.$^7$ .......................... H01M 10/44; H01M 10/46
(52) U.S. Cl. ............................................................. 320/150
(58) Field of Search ................................... 320/128, 137, 320/150, 151, 152, 162, 163, 164

(56) References Cited

U.S. PATENT DOCUMENTS

| | | |
|---|---|---|
| 3,667,026 * | 5/1972 | Bogut et al. . |
| 5,497,068 | 3/1996 | Shiojima ................................. 320/35 |
| 5,652,500 * | 7/1997 | Kadouchi et al. . |
| 5,739,673 | 4/1998 | Le Van Suu ............................ 320/31 |
| 5,886,527 | 3/1999 | Ito ........................................ 324/431 |
| 5,912,547 | 6/1999 | Grabon ................................. 320/150 |

OTHER PUBLICATIONS

Document No. Abstract Appl. No. 02406351 dated Dec. 26, 1990; Pub. No. 04351488 A, dated Dec. 4, 1992, Japan.
Document No. Abstract Appl. No. 04011138 dated Jan. 24, 1992; Pub. No. 05244729 A, dated Aug. 21, 1993, Japan.
Document No. Abstract Appl. No. 04293693 dated Oct. 7, 1992; Pub. No. 06121468 A, dated Apr. 28, 1994, Japan.
Document No. Abstract Appl. No. 08164597 dated Jun. 25, 1996; Pub. No. 08164597 A, dated Jan. 16, 1998, Japan.
Document No. Abstract Appl. No. 0621990 dated Jun. 12, 1996, Europe.

* cited by examiner

Primary Examiner—Edward H. Tso
(74) Attorney, Agent, or Firm—Welsh & Katz, Ltd.; Thomas W. Tolpin

(57) ABSTRACT

Charge is performed while restricting rises in temperature of batteries by maintaining the rise in temperature constant, and charge is terminated when the current value becomes not more than a specified value indicating completion of charge, when the temperature keeps on rising beyond a specified temperature rising value also by decreasing the current value, or when the battery temperature has increased beyond the target temperature value to be reached at the time of completion of charge by not less than a specified value, since charge has already been completed; in this manner, full charge may be appropriately detected so that 100% charge may be performed without causing excessive charge.

4 Claims, 15 Drawing Sheets

CHARGE OF NICKEL-METAL HYDRIDE BATTERY THAT IS CLOSE TO FULL CHARGE

Fig. 13
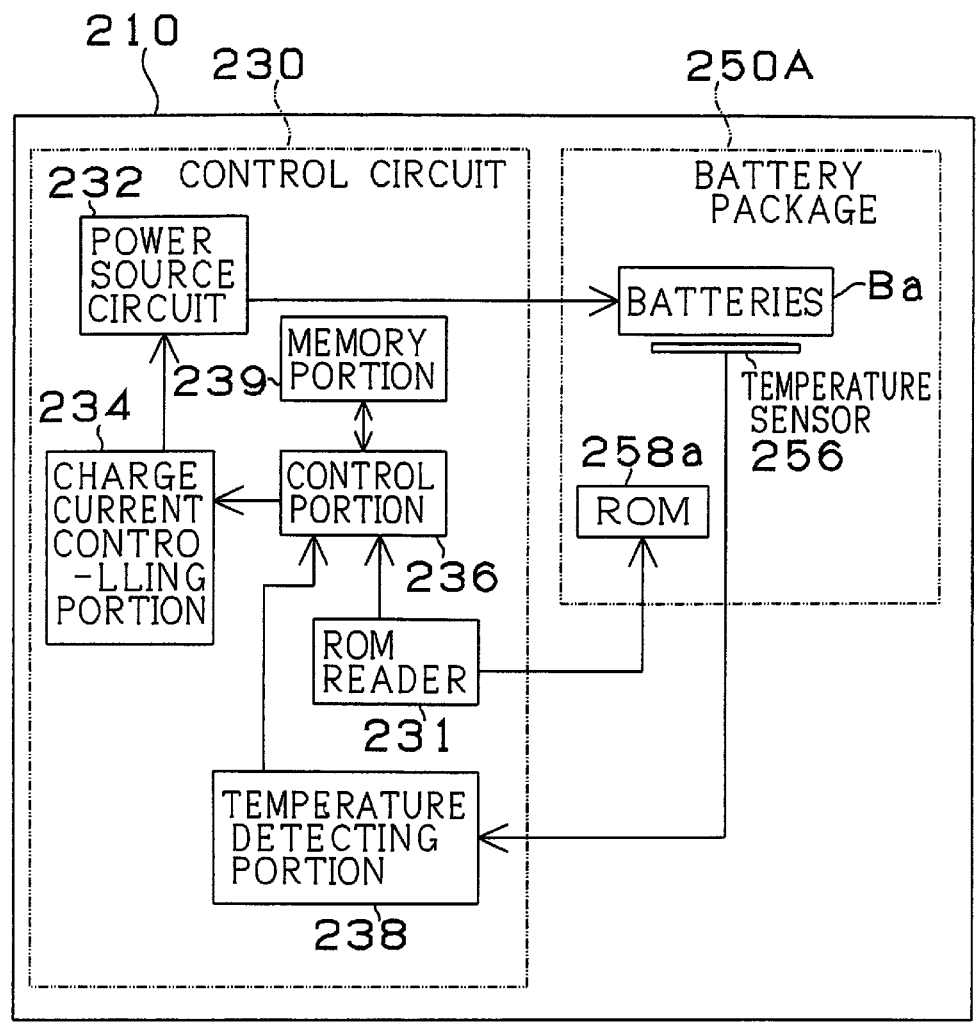
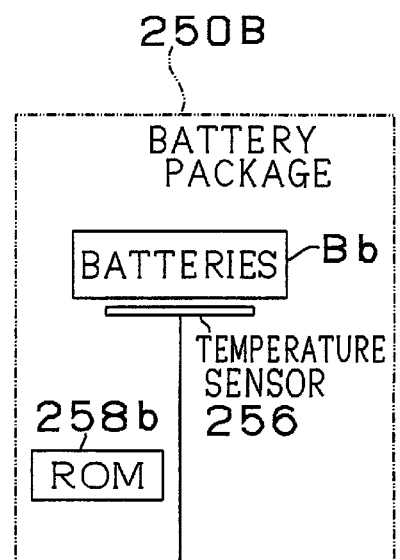

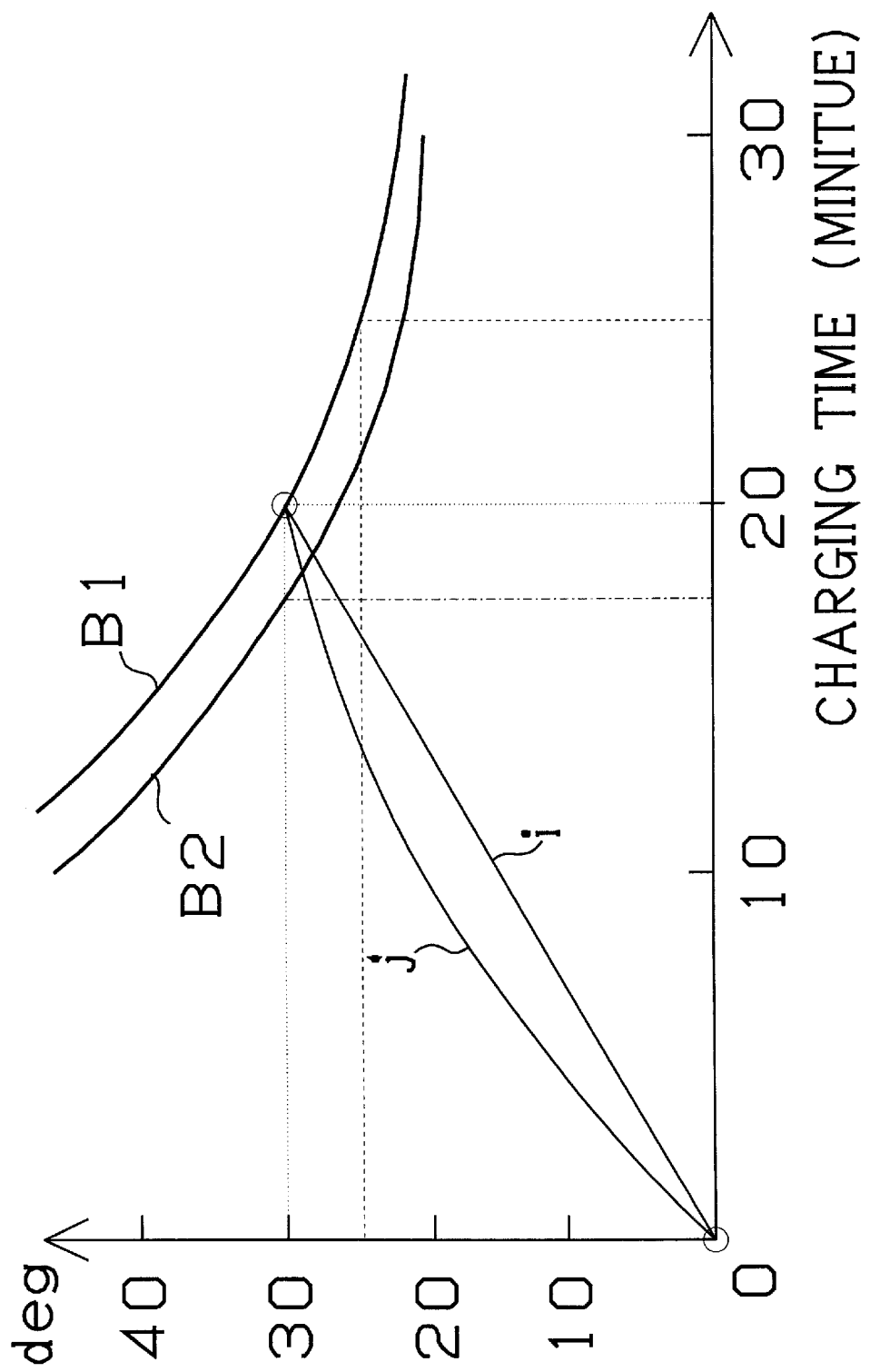

BATTERY CHARGING DEVICE AND CHARGING METHOD THEREOF

BACKGROUND OF THE INVENTION

The present invention relates to a battery charging device for charging batteries and a charging method thereof, and particularly to a battery charging device for charging batteries and a charging method thereof that may be favorably employed for charging batteries that generate a large amount of heat at the time of charging such as nickel-metal hydride batteries.

Rechargeable batteries that may be repeatedly used are currently being employed as power sources for power tools. Nickel-cadmium batteries are being widely used as batteries in such power tools, and battery charging devices performing rapid charge by supplying a large amount of current to the batteries are being employed. More particularly, by performing rapid charge of batteries in approximately 20 minutes, successive use of power tools is made possible while exchanging run down batteries with charged ones.

The inventors have considered whether it would be possible to improve performance of power tools by using nickel-metal hydride batteries as batteries. However, while nickel-metal hydride batteries enable an increase in capacity compared to nickel-cadmium batteries, they exhibit drawbacks in that the amount of generated heat at the time of charge is large, and in case a high temperature is reached through the heat generation, electrodes of internal cells of batteries or separators would degrade to thereby shorten the life of the batteries. Thus, rapid charge through a large amount of current as it had been performed in the above-described nickel-cadmium batteries could not be performed.

The invention has been made for solving the above-described subjects, and it is an object thereof to provide a battery charging device and a charging method thereof with which batteries may be charged in a short time while restricting rises in temperature of the batteries and without performing excessive charge.

BRIEF SUMMARY OF THE INVENTION

In order to solve the above problems, a battery charging device according to the present invention is characterized by comprising:

- a temperature detecting portion for detecting a present temperature of batteries,
- a temperature rising value outputting portion for obtaining a temperature rising value from the temperature as detected by the temperature detecting portion,
- a current value retrieving portion for retrieving a current value with which the temperature rising value as output from the temperature rising value outputting portion is made constant,
- a charge controlling portion for charging the batteries at the current value that has been retrieved by the current value retrieving portion, and
- a charge terminating portion for terminating charge when at least one of the following conditions are met:
  (a) when the current value has become not more than a specified value indicating completion of charge,
  (b) when the temperature keeps on rising beyond the constant temperature rising value even if the current value is decreased, and
  (c) when a battery temperature has increased beyond a target temperature value to be reached at the time of completion of charge by not less than a specified value.

In the invention, batteries are charged while adjusting a current value to achieve a constant temperature rising value. With this arrangement, it is possible to perform charge such that a temperature at the time of completion of charge becomes a specified value, and it is thus enabled to perform charge of nickel-metal hydride batteries or the like, which exhibit remarkable increases in temperature, in a short time without increasing the temperature to a high level.

By terminating charge when the current value has become a value that is not more than the specified value indicating that charge has been completed, it is enabled to perform charge up to 100% capacity and further to terminate charge without performing excessive charge. In case the temperature should keep on rising from the above constant temperature rising value also upon decreasing the current value, it is determined that an "overshoot" condition in which the temperature rapidly rises upon completion of charge has occurred. Thus, by terminating charge, it is possible to perform charge up to 100% capacity and further to terminate charge without performing excessive charge. Similarly, in case charge is performed while maintaining the temperature rise constantly, and the battery temperature has increased to beyond a target temperature value to be reached at the time of completion of charge and to be not less than a specified value, it is determined that charge has been already completed. Thus, by terminating charge, it is possible to perform charge up to 100% capacity without causing excessive charge.

A battery charging device according to the present invention is characterized by comprising:

- a memory means for storing target temperature values for the batteries to be reached,
- a temperature detecting portion for detecting a present temperature of the batteries,
- a temperature gradient calculating portion for calculating a temperature rising gradient from a charging time based on a difference between a temperature of batteries at the time charge is started and the target temperature value to be reached as stored in the memory means,
- a temperature rising value outputting portion for obtaining a temperature rising value from the temperature as detected by the temperature detecting portion,
- a current value retrieving portion for retrieving a current value with which the temperature rising value as output from the temperature rising value outputting portion becomes the temperature rising gradient,
- a charge controlling portion for charging the batteries at the current value that has been retrieved by the current value retrieving portion, and
- a charge terminating portion for terminating charge when at least one of the following conditions are met:
  (a) when the current value has become not more than a specified value indicating completion of charge,
  (b) when the temperature keeps on rising beyond the constant temperature rising value even if the current value is decreased, and
  (c) when a battery temperature has increased beyond the target temperature value to be reached at the time of completion of charge by not less than a specified value.

In the invention, a temperature rising gradient is calculated from a charging time based on a difference between a battery temperature at the start of charge and the target temperature value to be reached as stored in a memory means. Batteries are thus charged while adjusting current values such that the temperature rising value becomes equal to the temperature rising gradient. With this arrangement, it is enabled to perform charge such that the temperature at the time of completion of charge will be the target temperature value to be reached, and thus to perform charge of nickel-metal hydride batteries or the like, which exhibit remarkable increases in temperature, in a short time without increasing the temperature to a high level.

By terminating charge when the current value has become a value that is not more than the specified value indicating that charge has been completed, it is enabled to perform charge up to 100% capacity and further to terminate charge without performing excessive charge. In case the temperature should keep on rising from the above constant temperature rising value also upon decreasing the current value, it is determined that an "overshoot" condition in which the temperature rapidly rises upon completion of charge has occurred. Thus, by terminating charge, it is possible to perform charge up to 100% capacity and further to terminate charge without performing excessive charge. Similarly, in case charge is performed while maintaining the temperature rise constantly, and the battery temperature has increased to beyond a target temperature value to be reached at the time of completion of charge and to be not less than a specified value, it is determined that charge has been already completed. Thus, by terminating charge, it is possible to perform charge up to 100% capacity without causing excessive charge.

A battery charging device according to the present invention is characterized by comprising:

- a memory means for storing target temperature values for the batteries to be reached,
- a temperature detecting portion for detecting a present battery temperature,
- a temperature rising pattern retrieving portion for retrieving a temperature rising pattern for completing charge at the target temperature value to be reached based on a charging time and based on a difference between a temperature of batteries at the time charge is started and the target temperature value to be reached as stored in the memory means
- a temperature rising value outputting portion for obtaining a temperature rising value from the temperature as detected by the temperature detecting portion,
- a current value retrieving portion for retrieving a current value with which the temperature rising value as output from the temperature rising value outputting portion becomes the temperature rising pattern,
- a charge controlling portion for charging the batteries at the current value that has been retrieved by the current value retrieving portion, and
- a charge terminating portion for terminating charge when at least one of the following conditions are met:
  (a) when the current value has become not more than a specified value indicating completion of charge,
  (b) when the temperature keeps on rising beyond the constant temperature rising value even if the current value is decreased, and
  (c) when a battery temperature has increased beyond a target temperature value to be reached at the time of completion of charge by not less than a specified value.

In the invention, a temperature rising pattern is retrieved from a charging time based on a difference between a battery temperature at the start of charge and the target temperature value to be reached as stored in a memory means. Batteries are thus charged while adjusting current values such that the temperature rising value becomes equal to the temperature rising pattern. With this arrangement of optimizing the temperature rising pattern, it is enabled to perform charge such that the temperature at the time of completion of charge will be the target temperature value to be reached (lowermost temperature).

By terminating charge when the current value has become a value that is not more than the specified value indicating that charge has been completed, it is enabled to perform charge up to 100% capacity and further to terminate charge without performing excessive charge. In case the temperature should keep on rising from the above constant temperature rising value also upon decreasing the current value, it is determined that an "overshoot" condition in which the temperature rapidly rises upon completion of charge has occurred. Thus, by terminating charge, it is possible to perform charge up to 100% capacity and further to terminate charge without performing excessive charge. Similarly, in case charge is performed while maintaining the temperature rise extend along the temperature rising pattern, and the battery temperature has increased to beyond a target temperature value to be reached at the time of completion of charge and by not less than a specified value, it is determined that charge has been already completed. Thus, by terminating charge, it is possible to perform charge up to 100% capacity without causing excessive charge.

A battery charging method for storing information related to target temperature values to be reached corresponding to charging time on a battery side and according as the target temperature valves to be reached for performing charge in a battery charging device, the battery charging device according to the present invention is characterized by comprising:

- a memory means for storing a temperature rising pattern for completing charge at a target temperature value as read from the battery side,
- a temperature detecting portion for detecting a present temperature of the batteries,
- a temperature rising pattern retrieving portion for retrieving a temperature rising pattern from the memory means based on a temperature of batteries at the time charge is started and charging time,
- a temperature rising value outputting portion for obtaining a temperature rising value from the temperature as detected by the temperature detecting portion,
- a current value retrieving portion for retrieving a current value with which the temperature rising value as output from the temperature rising value outputting portion becomes the temperature rising pattern,
- a charge controlling portion for charging the batteries at the current value that has been retrieved by the current value retrieving portion, and
- a charge terminating portion for terminating charge when at least one of the following conditions are met:
  (a) when the current value has become not more than a specified value indicating completion of charge,
  (b) when the temperature keeps on rising beyond the constant temperature rising value even if the current value is decreased, and
  (c) when a battery temperature has increased beyond a target temperature value to be reached at the time of completion of charge by not less than a specified value.

A temperature rising pattern is retrieved from a charging time based on a difference between a battery temperature at the start of charge and the target temperature value to be reached as stored in a memory means. Batteries are thus charged while adjusting current values such that the temperature rising value becomes equal to the temperature rising pattern. With this arrangement of optimizing the temperature rising pattern, it is enabled to perform charge such that the temperature at the time of completion of charge will be the target temperature value to be reached (lowermost temperature).

In the invention, data related to target temperature values to be reached are stored on the batteries side so that charge may be performed such that respective temperatures at the time of completion of charge will be the target temperature value to be reached (lowermost temperature). Moreover, it is possible to perform charge such that respective temperatures at the time of completion of charge will be the target temperature value to be reached (lowermost temperature) in various types of battery charging devices, either a battery charging device with which rapid charge may be performed in 15 minutes or a battery charging device with which charge may be performed in 1 hour.

By terminating charge when the current value has become a value that is not more than the specified value indicating that charge has been completed, it is enabled to perform charge up to 100% capacity and further to terminate charge without performing excessive charge. In case the temperature should keep on rising from the above constant temperature rising value also upon decreasing the current value, it is determined that an "overshoot" condition in which the temperature rapidly rises upon completion of charge has occurred. Thus, by terminating charge, it is possible to perform charge up to 100% capacity and further to terminate charge without performing excessive charge. Similarly, in case charge is performed while maintaining the temperature rise extend along the temperature rising pattern, and the battery temperature has increased to beyond a target temperature value to be reached at the time of completion of charge and by not less than a specified value, it is determined that charge has been already completed. Thus, by terminating charge, it is possible to perform charge up to 100% capacity without causing excessive charge.

BRIEF DESCRIPTION OF THE DRAWINGS

FIG. 13 is a block diagram showing a control circuit of the battery charging device according to a third embodiment.

FIG. 15 is an explanatory view showing a theory for charging of the battery charging device of the third embodiment.

DETAILED DESCRIPTION OF THE INVENTION

The battery charging device and charging method thereof according to the preferred embodiments of the present invention will now be explained with reference to the drawings.

Figure 1:
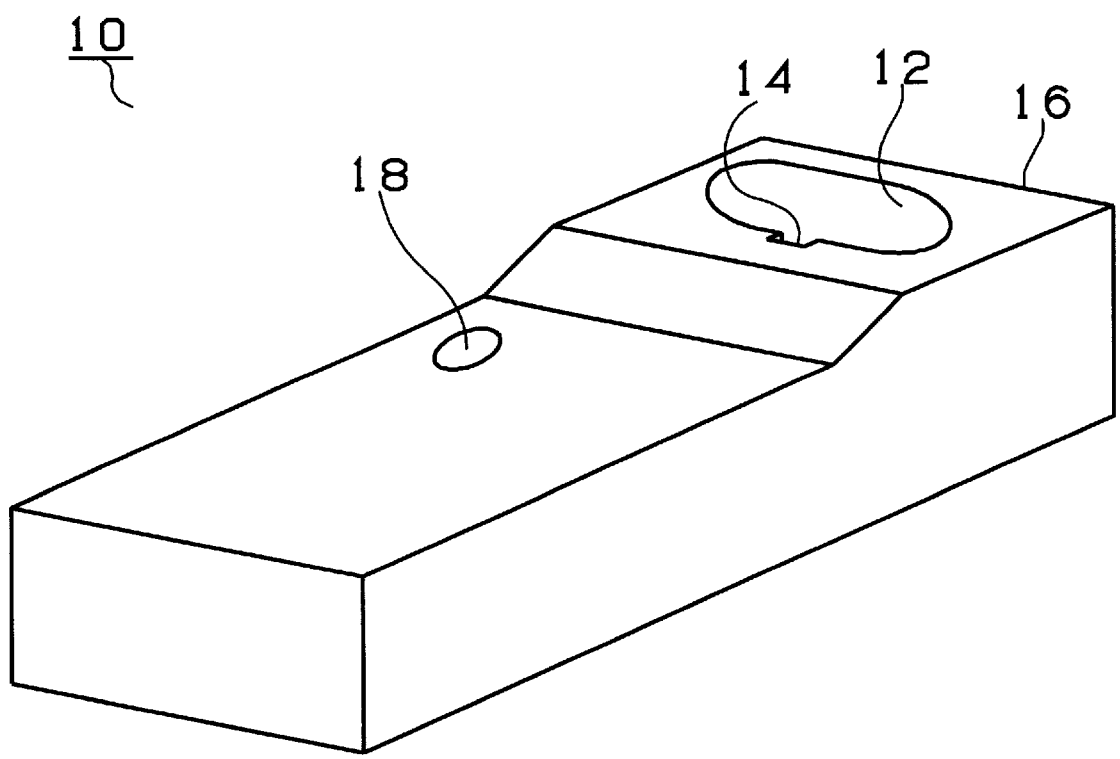
FIG. 1 is a perspective view of the battery charging device according to one form of the preferred embodiment of the present invention.
Figure 2:
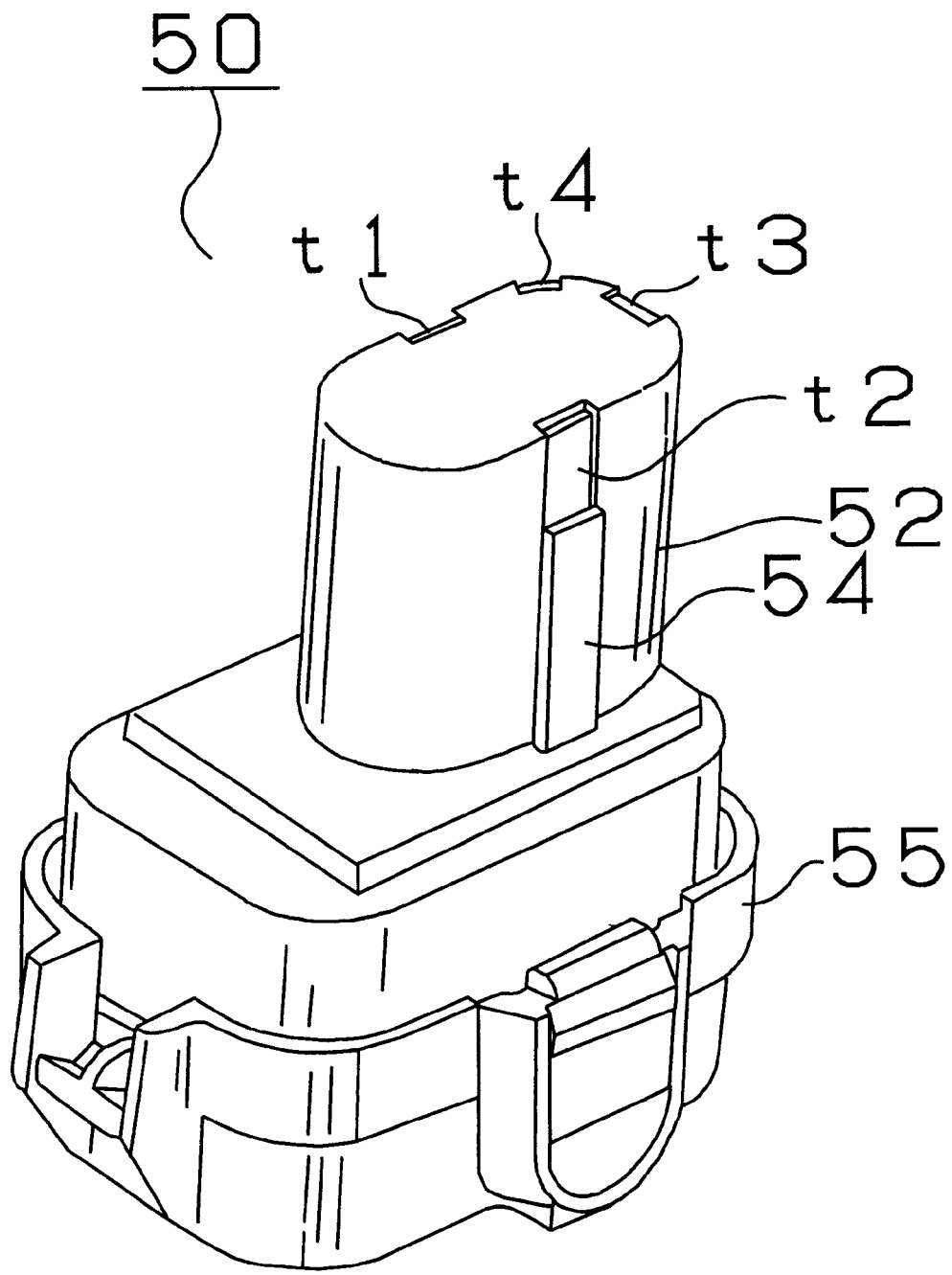
FIG. 2 is a perspective view of a battery package according to the one form of embodiment of the present invention.
Figure 3:
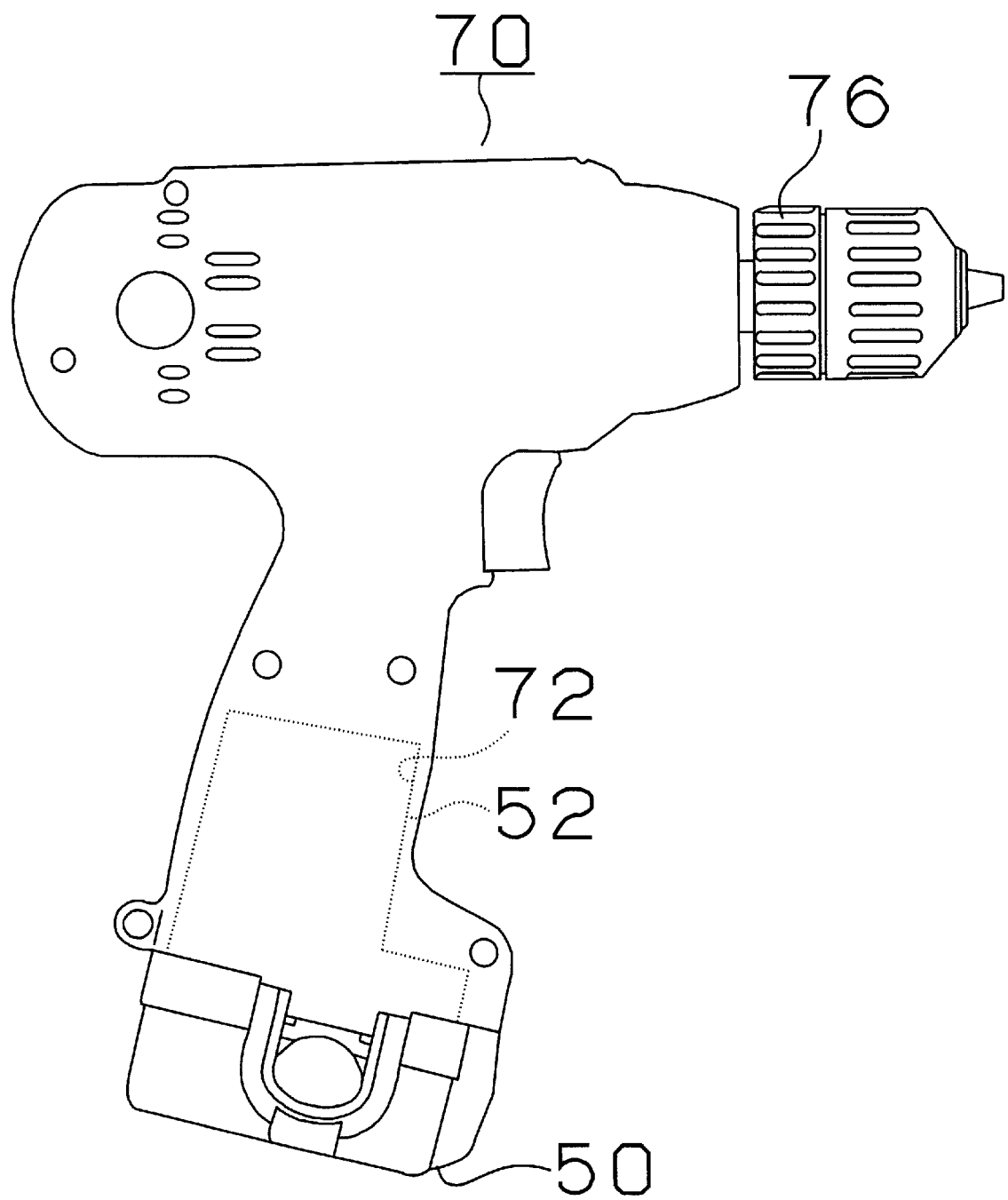
FIG. 3 is a perspective view of a battery-driven drill employing the battery package of FIG. 2.

FIG. 1 illustrates a battery charging device 10 according to a first embodiment of the present invention, FIG. 2 a battery package 50 that is charged by the battery charging device 10, and FIG. 3 a battery-driven drill 70 that is driven by the battery package 50.

As illustrated in FIG. 2, the battery package 50 incorporating therein nickelmetal hydride batteries is comprised of a fitting portion 52 formed to assume a substantially cylindrical shape and a base portion 55 formed to assume a substantially prism-like shape, wherein a key-shaped key portion 54 is formed on a lateral side of the fitting portion 52 while a first terminal t1 connected to positive pole sides of the batteries, a second terminal t2 connected to negative pole sides, a third terminal t3 connected to a temperature sensor comprised by a thermistor, and a fourth terminal t4 connected to a ROM are respectively formed on an upper portion of the fitting portion 52.

As illustrated in FIG. 1, the battery charging device 10 for charging the battery package 50 is formed with a fitting hole 12 for fitting the fitting portion 52 of the battery package 50 therein, and a key groove 14 is formed on a lateral wall of the fitting hole 12 for introducing the key portion 54 of the fitting portion 52 therein. The fitting hole 12 is integrally formed with a box body 16 comprising the battery charging device 10 through resin. In the illustrated embodiment, the provision of the key portion 54 formed in the fitting portion 52 of the battery package 50 and the key groove 14 formed in the fitting hole 12 of the battery charging device 10 make it possible to prevent the battery package 50 from being attached in an erroneous direction. For this purpose, first to fourth terminals (not shown) are formed on a bottom portion of the fitting hole 12 for abutting the first to fourth terminals t1, t2, t3 and t4 of the battery package 50. A LED lamp 18 for indicating that charge is being performed is provided on an upper portion of the battery charging device 10.

As illustrated in FIG. 3, the battery-driven drill 70 is formed with a fitting hole 72 for fitting the fitting portion 52 of the battery package 50 therein, and is arranged to rotate a chuck 76 through a motor (not shown) upon supply of electric power from the first terminal t1 and the second terminal t2 of the battery package 50. When using the battery-driven drill 70, successive operation is enabled by sequentially using one battery package 50 of which charge has completed among a plurality of battery packages 50. For this purpose, the battery charging device 10 of the illustrated embodiment is arranged to be capable of performing rapid charge of the battery package 50 in approximately 30 minutes.

Figure 4:
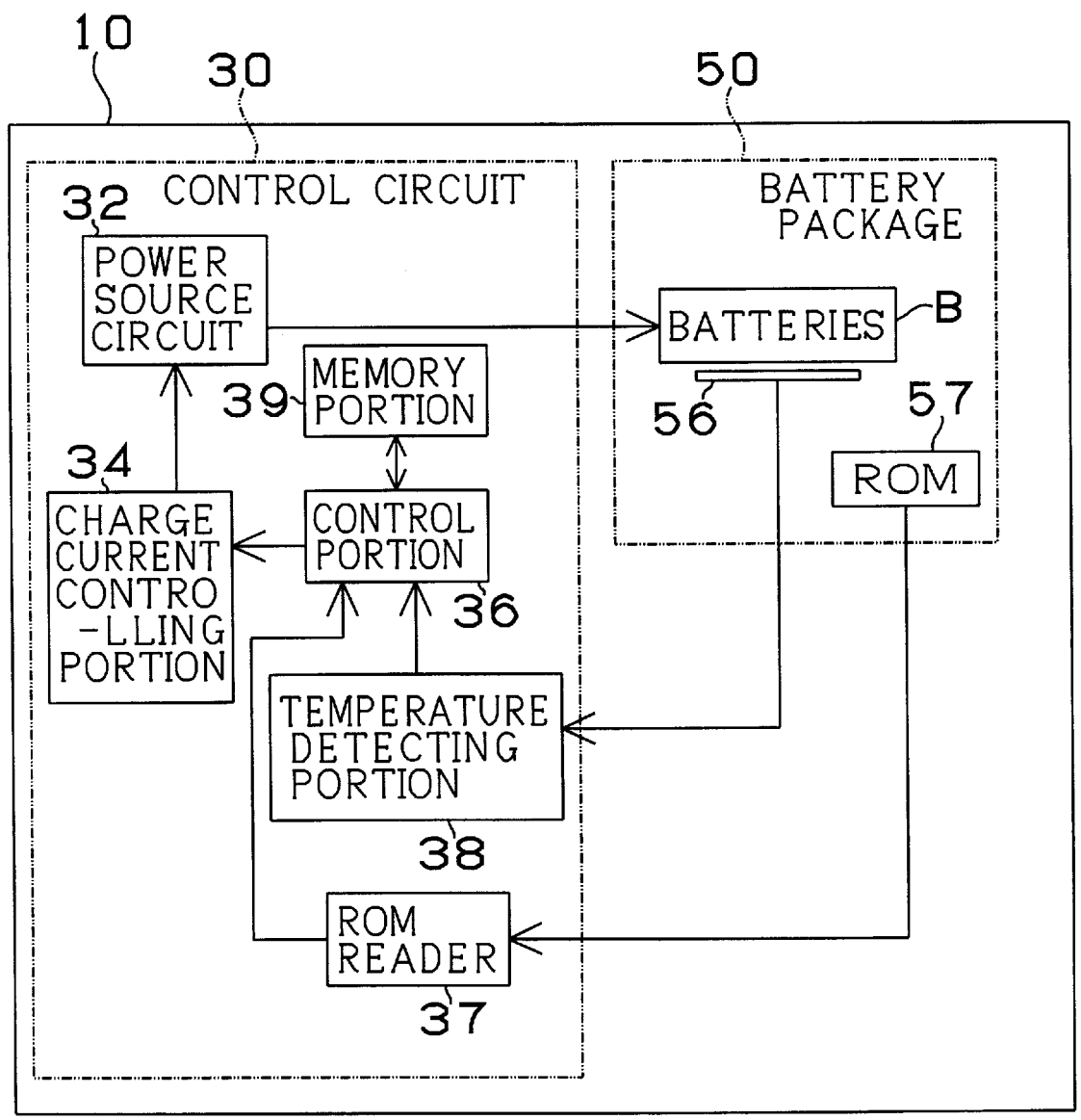
FIG. 4 is a block diagram showing a control circuit of the battery charging device of FIG. 1.

FIG. 4 illustrates an arrangement of a control circuit 30 provided within the battery charging device 10. The control circuit 30 is comprised of the following: a temperature detecting portion 38 for detecting a battery temperature based on an output value of the temperature sensor (thermistor) 56 provided on the battery package 50 side; a memory portion 39 for storing information for controlling current values in form of maps or the like (to be described later); a control portion 36 for obtaining a temperature rising value by differentiating the temperature value as output by the temperature detecting portion 38, obtaining a current value at which charge may be performed while maintaining the temperature rising value constant, and outputting the current value as a current command value to a charge current controlling portion 34; a charge current controlling portion 34 for controlling a power source circuit 32 based on the current command value from the control portion 36 and for adjusting a charge current for the batteries; and a ROM reader 37 for reading contents of a ROM 57 on the battery package 50 side.

A theory for operating the battery charging device of the first embodiment will now be explained.

It is generally the case with batteries that by setting the charge current to be large, it is possible to shorten the time for charge but the rise in temperature will be large. On the other hand, in case the charge current is set to be small, the rise in temperature will be small while the time for charge will become longer. Particularly nickel-metal hydride batteries exhibit characteristics that temperature gradients (temperature rising values) are largely varied depending on charge currents or already charged capacities. In view of this fact, charge is performed in the illustrated embodiment by varying current values for restricting rises in temperature. More particularly, while charge had been performed at constant current values in conventional battery charging devices, charge is performed in the battery charging device of the illustrated embodiment by determining conditions of the batteries on a basis of temperature rising values and at current that may be supplied while restricting rises in temperature of the batteries, that is, by varying current values in accordance with temperature rising conditions of the batteries.

Here, in case the rise in temperature is large, a relatively small charge current is supplied while a relatively large charge current is supplied when the rise in temperature is small.

Figure 5:
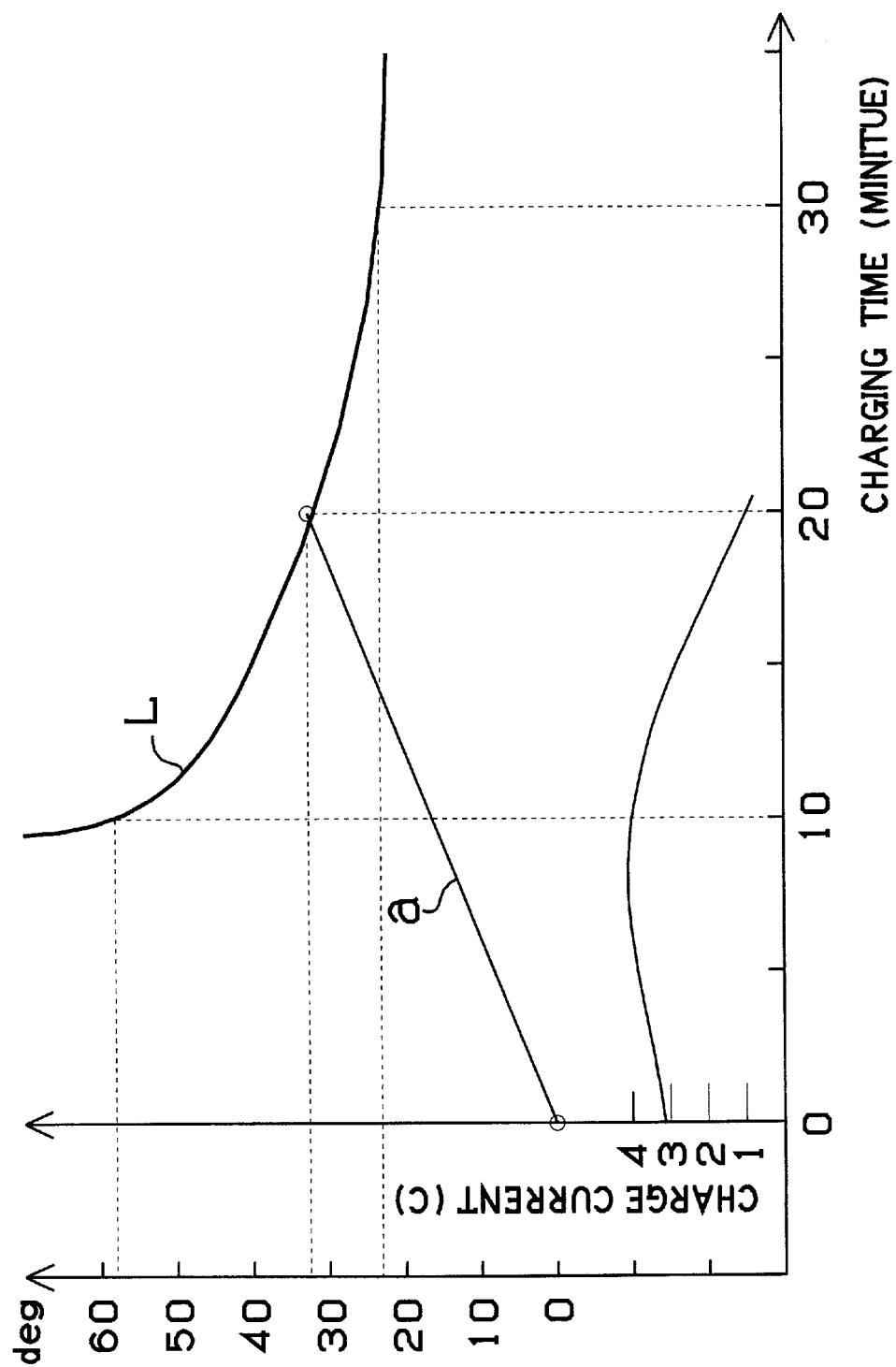
FIG. 5 is an explanatory view showing a theory for charging of the battery charging device of a first embodiment.

The theory for operating the battery charging device of the first embodiment will be further explained in details with reference to FIG. 5. In FIG. 5, the longitudinal axis represents temperature rising values of the batteries while the lateral axis represents charging time, and the illustrated curve L indicates temperature rising values at the time of completion of charge corresponding to the charging time when charge is performed such that the temperature rising value is constant. For instance, it is obvious from this drawing that in case the current is controlled such that the battery temperature starting at 20° C. reaches 53° C. (temperature rising value: 33 deg), the charging time will be 20 minutes; that in case the current is controlled such that the battery temperature reaches 43° C. (temperature rising value: 23 deg.), the charging time will be 30 minutes; and that in case the current is controlled such that the battery temperature reaches 78° C. (temperature rising value: 58 deg), the charging time will be 10 minutes.

In other words, it is possible to obtain a temperature rising value (gradient) from the time of completion of charge and from the temperature rising value of the batteries at the time of completion of charge based on the curve L. It can be understood that for completing charge in 20 minutes, for instance, charge shall be performed such that the temperature gradient (temperature rising value) as represented by straight line a connecting the 0 deg point and the 33 deg point on the illustrated curve L. In this case, charge is completed when temperature has reached 53° C. (temperature rising value: 33 deg) after almost accurate elapse of 20 minutes.

On the other hand, in case charge is to be completed in 20 minutes when the outside-air temperature and the battery temperature is 10° C., charge shall be performed such that the temperature gradient (temperature rising value) as represented by solid line a connecting the 0 deg point and the 33 deg point on the illustrated curve L. In this case, charge is completed at temperature 43° C. (temperature rising value: 33 deg).

On the other hand, in case charge is to be completed in 20 minutes when the outside-air temperature and the battery temperature is 30° C., charge shall be performed such that the temperature gradient (temperature rising value) as represented by solid line a connecting the 0 deg point and the 33 deg point on the illustrated curve L. In this case, charge is completed at temperature 63° C. (temperature rising value: 33 deg).

Variations in current values when the temperature rising value is set to be constant will now be explained here with reference to FIGS. 6 and 7.

Figure 6:
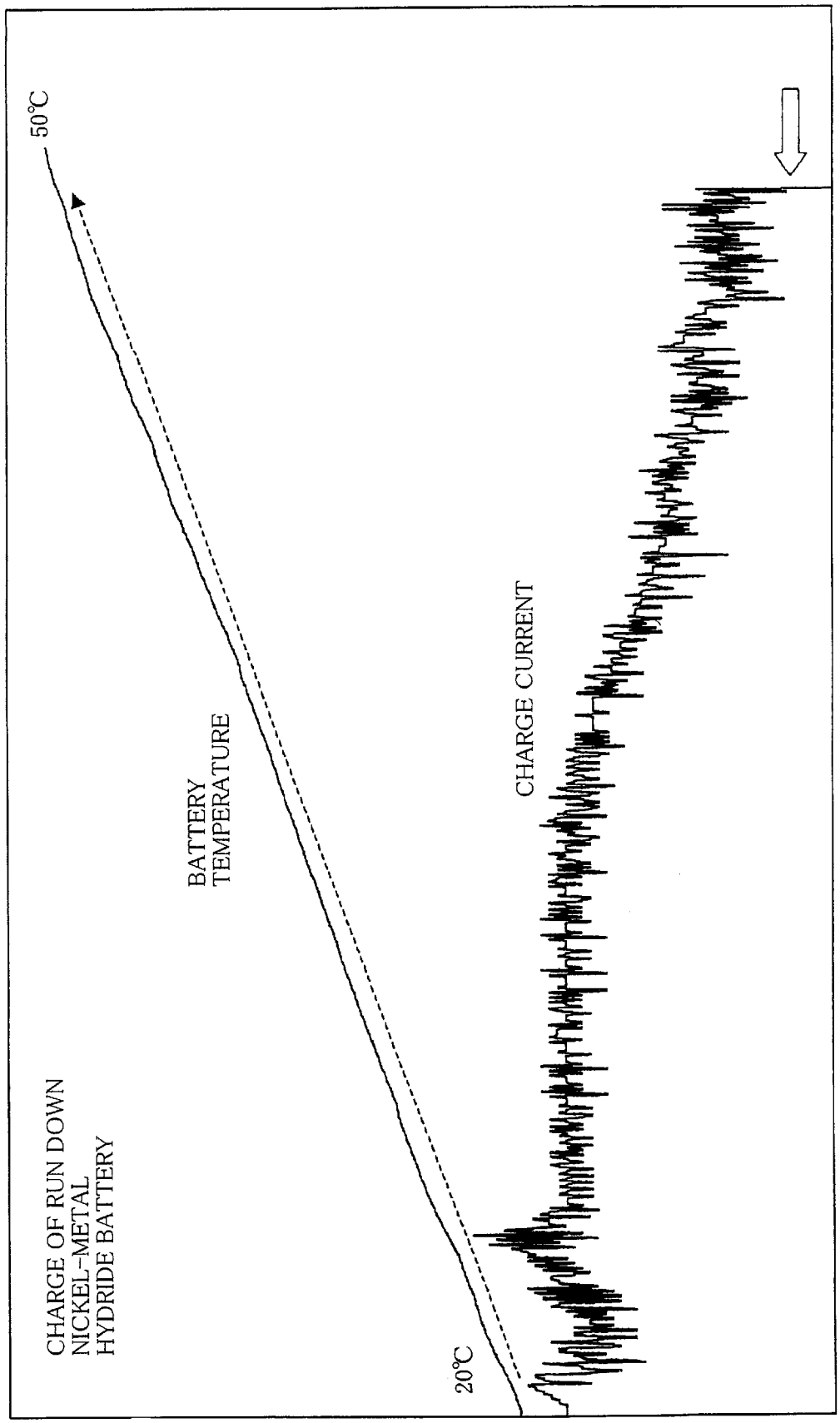
FIG. 6 is a graph showing changes in charge current and battery temperature as controlled by the battery charging device.

FIG. 6 illustrates a result of simulation in which nickel-metal hydride batteries of 20° C. are charged for 25 minutes to reach a battery temperature of 50° C. While it will be necessary to frequently adjust the charge current for setting the temperature rising value constant, it can be understood that the current value is relatively large in the former part of charge while it becomes gradually smaller in the latter part of charge. The abrupt decrease in charge current at approximately 50° C. indicates that charge of the nickel-metal hydride batteries has been completed, and charge is terminated in the illustrated embodiment when this phenomenon has been detected.

Figure 7:
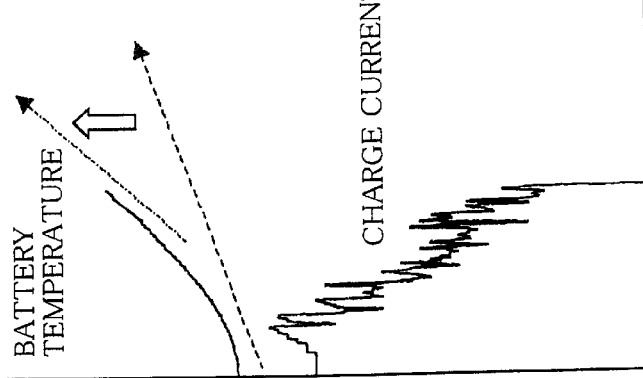
FIG. 7 is a graph showing changes in charge current and battery temperature as controlled by the battery charging device.

FIG. 7 illustrates a result of simulation using different nickel-metal hydride batteries. It is the case with nickel-metal hydride batteries that so-called "overshoot" phenomena may occur in which the temperature is abruptly increased at the time of completion of charge not on a basis of the present charge current but on a basis of past hysteresis of charge. In the presence of such overshoot, it is impossible to set the temperature rising value to be not more than a specified value also by decreasing the current value. In the illustrated embodiment, charge is completed also in case such phenomena are detected.

Moreover, the battery charging device 10 performs charge while maintaining the rise in temperature constant as already described. In this case, charge is completed in case the battery temperature has increased to a target temperature value to be reached at the time of completion of charge. Thus, charge is terminated in case the temperature further rises to exceed the target temperature value to be reached at the time of completion of charge.

Figure 8:
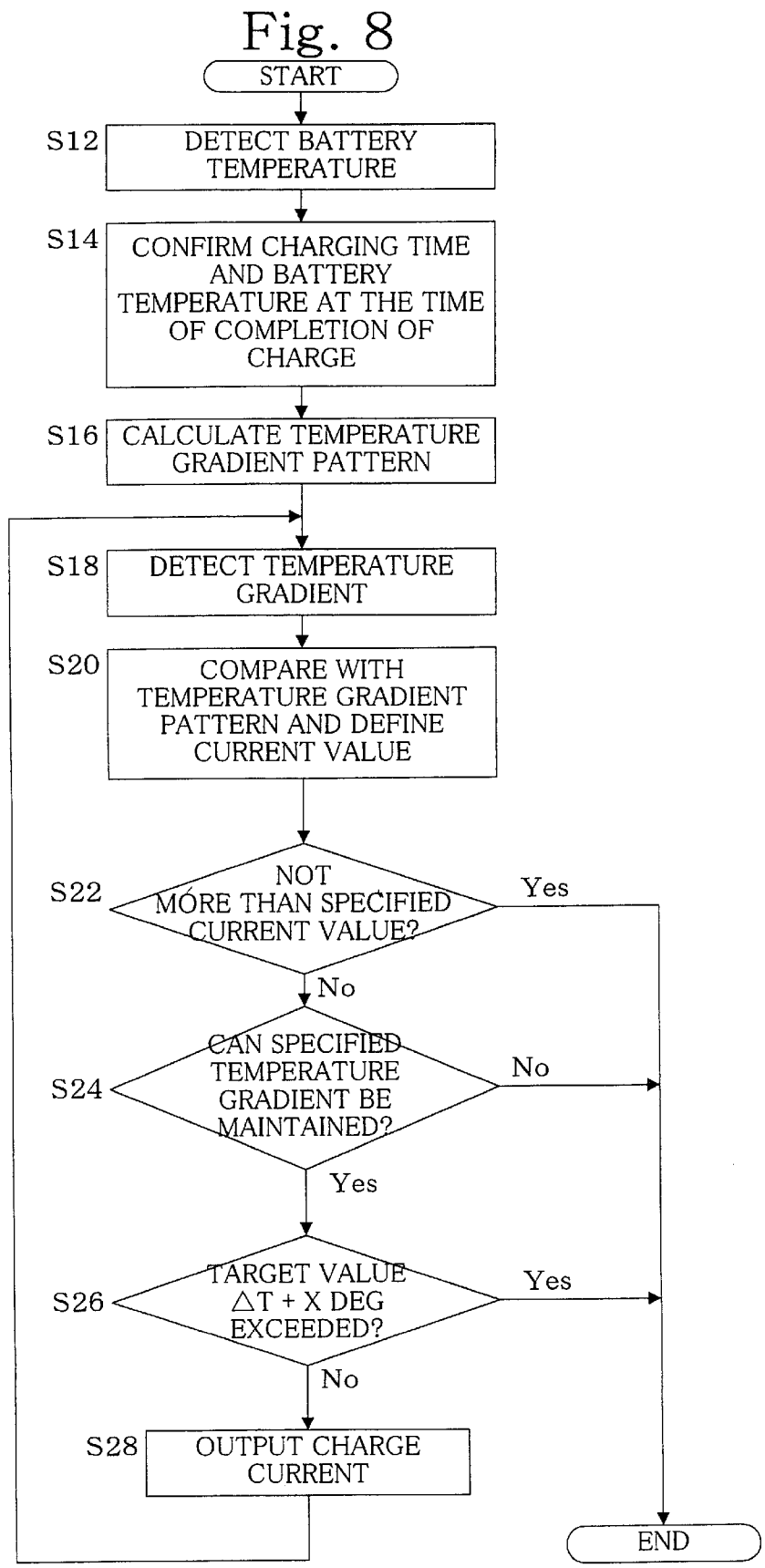
FIG. 8 is a flowchart showing processes performed in a control portion of the battery charging device of the first embodiment.

Charge performed by the battery charging device of the first embodiment will be further explained with reference to the flowchart of FIG. 8 showing processes thereof.

The control portion 36 detects the temperature of the battery package 50 through the temperature detecting portion 38 (S12). Here, it is assumed that the outside-air temperature and the battery temperature were 20° C. Next, the charging time and battery temperature at the time of completion of charge are confirmed (S14). In the illustrated embodiment, the battery charging device is arranged to be switchable between rapid charge (20 minutes charge) and ordinary charge (30 minutes), and in case the device is set to perform rapid charge, the memory portion 39, which stores therein the values for the curve L as described above with reference to FIG. 5, is retrieved with reference to FIG. 5 to thereby obtain 53° C. as the temperature at the time of completion of charge. Thereafter, the temperature gradient is calculated (S16). Here, the gradient of straight line a connecting the 0 deg point and the 33 deg point on the curve L as illustrated in FIG. 5 is obtained.

The control portion 36 obtains the temperature rising value by differentiating a difference between the previous temperature value as input from the temperature detecting portion and the currently input temperature value (S18), and the detected temperature rising value is compared with the gradient as calculated in Step 16 for defining a current value (S20). In case the temperature rising value is lower than the gradient, the current value is further increased from the current value, and vice versa, if it is higher, the current value is decreased.

It is then judged whether the current value is not more than a specified value (S22). As explained above with reference to FIG. 6, in case the current value is not more than a specified value upon completion of charge (S22: YES), charging processes are completed. On the other hand, in case the current exceeds the specified value (S22: NO), it is further judged whether the specified temperature gradient can be maintained by adjusting the current value, that is, whether no overshoot as explained above with reference to FIG. 7 has occurred (S24). In case overshoot has occurred (S24: NO), the charging processes are completed. On the other hand, in case no overshoot has occurred (S24: YES), it is judged whether the battery temperature has reached a temperature (55°C.) which is the temperature at the time of completion of charge (target temperature value to be reached ° C. T), namely 53° C., increment by a specified value (x deg: in this case, 2° C.)(S26). In case the battery temperature exceeds the target temperature value to be reached by more than a specified value, charge is already completed (S26: YES) so that processes are terminated. On the other hand, the processes proceeds to Step 28 until the battery temperature exceeds the target temperature value to be reached (S26: NO), and batteries are charged at the current value as defined in Step 20 for further continuing charging processes.

The battery charging device according to the first embodiment of the present invention is advantaged in that processes are simple since the temperature rising value is set to be constant. Batteries are further charged while adjusting the current value such that the temperature rising value becomes equal to the temperature rising gradient. With this arrangement, charge may be performed such that the temperature at the time of completion of charge becomes the target temperature value to be reached, and nickel-metal hydride batteries or the like, which exhibit remarkable rises in temperature, may be charged in a short time while preventing the batteries from reaching a high temperature.

The battery charging device according to the first embodiment is further arranged in that charge is terminated when the current value becomes not more than a specified value indicating completion of charge (S22: YES). In case the temperature keeps on rising beyond the specified temperature rising value also by decreasing the current value (S24: NO), an "overshoot" has occurred in which the temperature abruptly rises at the time of completion of charge, so that charge is terminated. Similarly, in case charge is performed while maintaining the rise in temperature constant, and the battery temperature has increased beyond the target temperature value to be reached at the time of completion of charge by not less than a specified value (S26: YES), charge has already been completed so that charge is terminated. In other words, since charge is terminated in the first embodiment by judging completion of charge by the above three types, full charge may be appropriately detected so that 100% charge may be performed without causing excessive charge. It should be noted that completion of charge might be judged also by omitting the judging step(s) of Step 22 and/or Step 24.

It should further be noted that while the curve L as illustrated in FIG. 5 is arranged to be stored on the battery charging device side in the illustrated embodiment, it is alternatively possible to store a maximum temperature for charge, which is set to be in a range with which life of nickel-metal hydride batteries are not shortened (for instance, 30 deg), and charging time for reaching the 30 deg (for instance, 25 minutes) only, and to control charge such that charge is completed at this 30 deg. The arrangement may be further simplified to set the temperature gradient of batteries to be continuously constant and to perform charge at this temperature gradient.

The battery charging device according to a second embodiment of the present invention will further be explained with reference to FIGS. 9 to 12. In the above-described battery charging device of the first embodiment, the current value was adjusted to set the temperature rising value constant. In contrast thereto, the current value is adjusted in the battery charging device of the second embodiment such that the temperature rises along a specified pattern.

Figure 9:
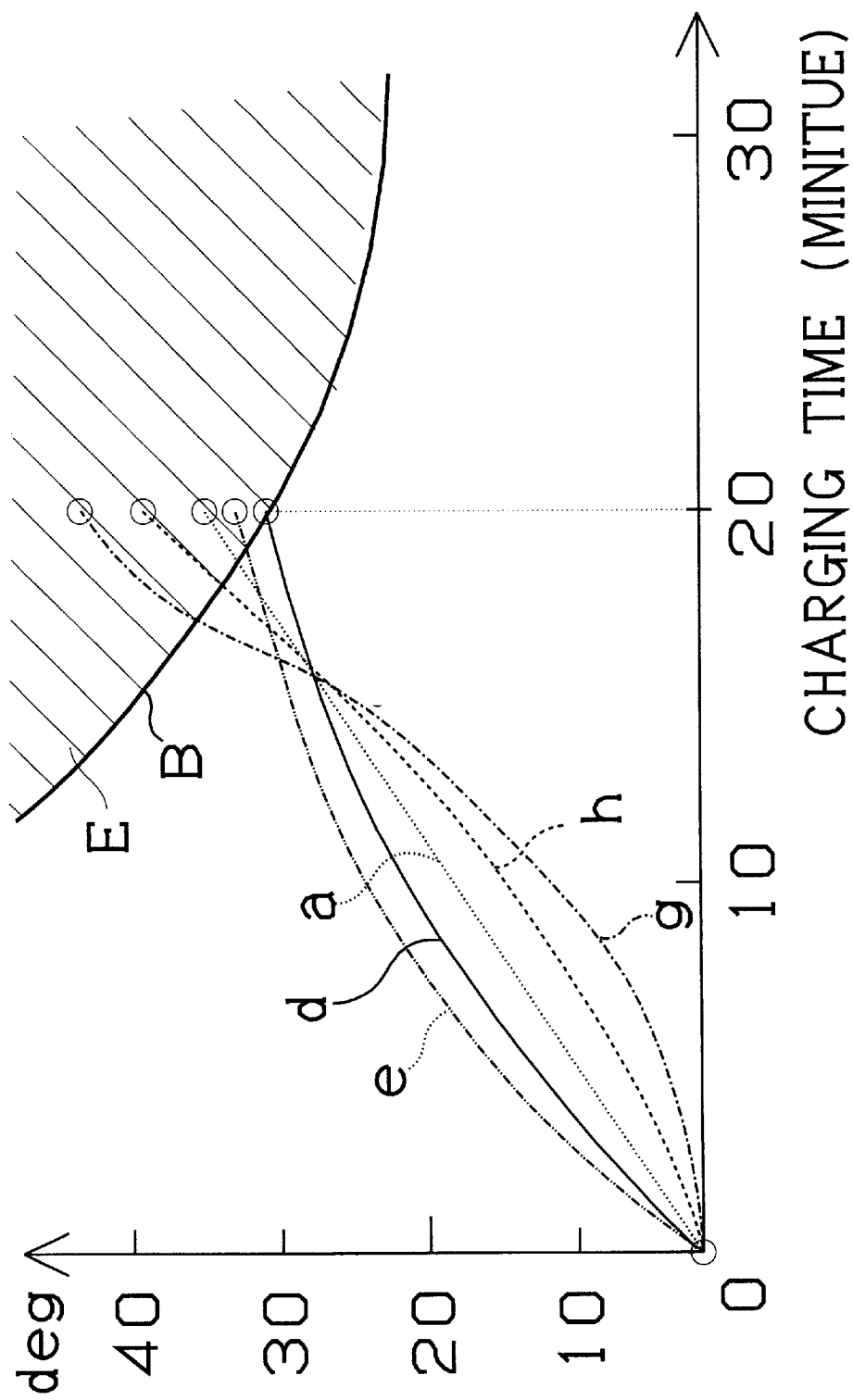
FIG. 9 is an explanatory view showing a theory for charging of the battery charging device of a second embodiment.

This theory for charging will be explained with reference to FIG. 9. In FIG. 9, the longitudinal axis represents temperature rising values of the batteries and the lateral axis charging time, and area E illustrated by the hatching indicates the temperature rising value and charging time at the time of completion. In case the temperature gradient as illustrated by a in the drawing is set to be constant such that charge is completed in 20 minutes as in the battery charging device of the first embodiment, the temperature at the time of completion of charge was 33 deg. On the other hand, in case charge is performed such that the temperature rising value as illustrated by the solid line d in the drawing extends along a convex rising pattern, charge could be completed with the temperature rising value of the batteries being 30 deg. In case charge is performed with the temperature rising value extending along a further convex rising pattern as represented by the two-dot chain line e that is larger than the solid line d, charge could be completed with the temperature rising value of the batteries being 32 deg. On the other hand, in case charge is performed along a concave rising pattern as represented by the broken like h, charge was completed with the temperature rising value of the batteries being 38 deg. On the other hand, when charge is performed as represented by the one-dot chain line g in which the temperature rising value does not fit any particular pattern, the temperature rising value has increased close to 43 deg.

More particularly, the area E as represented by the hatching indicates the temperature rising value and charging time at the time of completion of charge when charge is performed under various conditions, and borderline B of the area E indicates a target rising value to be reached when charge is completed at a lowermost temperature. On the other hand, when the temperature rising value is set to be constant as in the first embodiment, the temperature rising value of the batteries was 33 deg as it can be understood from the broken like a of FIG. 9. In contrast thereto, by setting a temperature rising pattern that is a slightly convex rising pattern as represented by solid line d, charge may be completed at a lowermost temperature rising value (30 deg). The reason why charge may be completed at a lower temperature by setting the temperature rising value to be rising in a convex manner rather than by setting it to be constant is considered to be as follows. A temperature rising pattern is set in which the temperature rising value in the former part of charge is set to be relatively high during which the temperature difference between the battery temperature and the peripheral temperature is small, the batteries are hardly cooled, the capacity is almost zero, and the rise in temperature at the time of charge is relatively small, and the temperature rising value in the latter part of charge is set to be relatively low during which the temperature difference between the battery temperature and the peripheral temperature is large, the batteries are easily cooled, and the rise in temperature at the time of charge is relatively large. By setting a temperature rising pattern for optimizing these in a synergistic manner, it is possible to perform charge such that the temperature at the time of completion of charge becomes a lowermost temperature. In the illustrated embodiment, charge is performed by adjusting the current value based on a temperature rising pattern with which charge may be completed at a lowermost temperature by utilizing the above test results.

Figure 10:
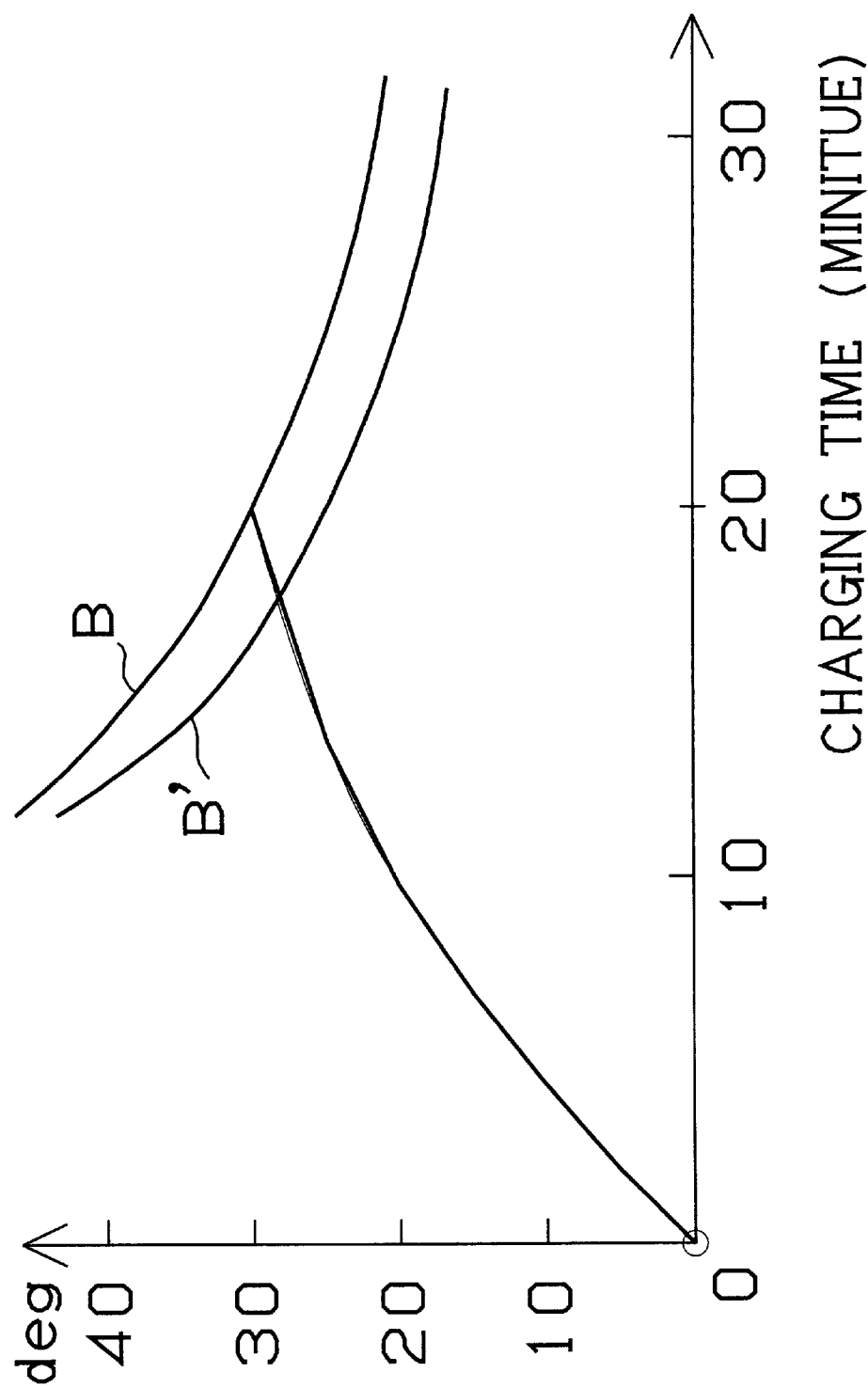
FIG. 10 is an explanatory view showing a theory for controlling the battery charging device of the second embodiment.

FIG. 10 illustrates variations in battery temperature of borderline B. Here, the borderline B indicates a case in which the outside-air temperature (20° C.) and the battery temperature are equal, and borderline B' in which the battery temperature (20° C.)is higher than the outside-air temperature (15° C.). Here, the borderline B' is shifted more downward than the borderline B by 5° C.

Figure 11:
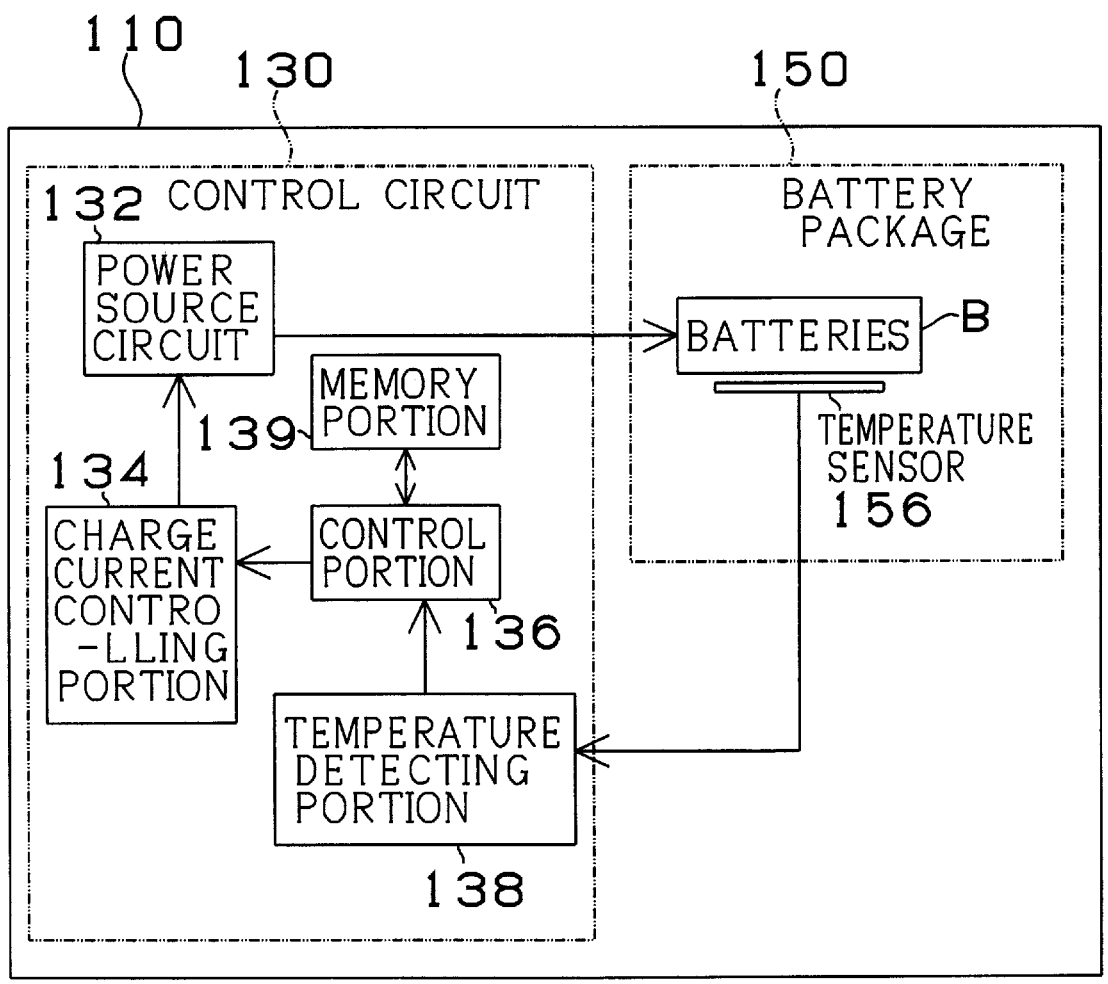
FIG. 11 is a block diagram showing a control circuit of the battery charging device of the second embodiment.

FIG. 11 illustrates an arrangement of a control circuit 130 provided within the battery charging device 110 of the second embodiment. The control circuit 130 is identical to that of the battery charging device of the first embodiment that has been explained above with reference to FIG. 4. However, a memory portion 139 of the control circuit 130 of the second embodiment stores therein the temperature rising pattern that has been explained above with reference to FIG. 9. The temperature rising pattern is maintained to be closely analogous to a sort of line graph by a time in which a rise of 5 deg is reached. For instance, in the temperature rising pattern of solid line d that has been explained above with reference to FIG. 9, 5 deg is reached in 2 minutes, 10 deg in 4 minutes, 15 deg in 6 minutes, 20 deg in 9 minutes, 25 deg in 13 minutes, and 30 deg in 20 minutes. That is, by storing the pattern in a form of data (2, 4, 6, 9, 13, 20), decreases in capacity of the memory portion and simplification of calculating processes in the control portion 136 can be achieved. When performing control of temperature, charge current is adjusted such that it extends along a gradient closely analogous to the straight line as illustrated in FIG. 10 by each 5 deg.

When performing charge of batteries of 20° C. when the outside-air temperature is 15° C., a pattern is calculated in which the temperature rising value at the time of completion of charge is decreased by 5° C. as explained above with reference to FIG. 10, and charge is performed in according with this pattern. On the other hand, when performing charge of batteries of 20° C. when the outside-air temperature is 25° C., a pattern is calculated in which the temperature rising value at the time of completion of charge is increased by 5° C.

Figure 12:
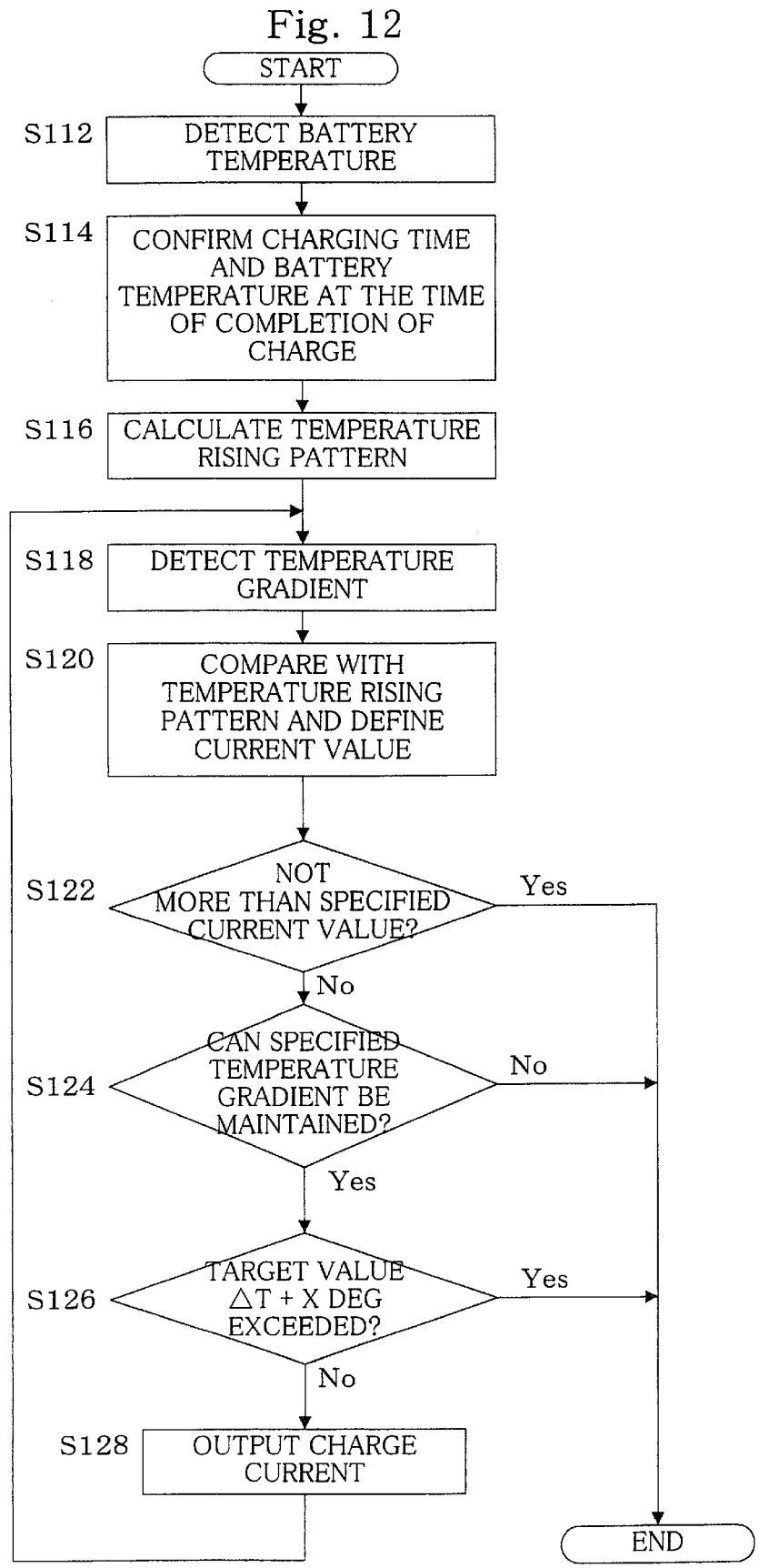
FIG. 12 is a flowchart showing processes performed in a control portion of the battery charging device of the second embodiment.

Concrete control of charge as performed in the battery charging device of the second embodiment will now be explained with reference to FIG. 12.

The control portion 136 detects the temperature of battery package 150 (S112). Here, it is assumed that the outside-air temperature was 20° C. and battery temperature 25° C. Next, the charging time and battery temperature at the time of completion of charge are confirmed (S114). Here, the final temperature rising value 35 deg (30 deg+5 deg) is obtained when the charging time is set to be 20 minutes. Thereafter, the temperature rising pattern is calculated (S116).

The control portion 136 obtains the temperature rising value by differentiating a difference between the previous temperature value as input from the temperature detecting portion and the currently input temperature value (S118), and the detected temperature rising value is compared with the temperature rising pattern as calculated in Step 116 for defining a current value (S120). In case the temperature rising value is lower than the gradient, the current value is further increased from the current value, and vice versa, if it is higher, the current value is decreased.

It is then judged whether the current value is not more than a specified value (S122). Similarly to the first embodiment, in case the current value is not more than a specified value upon completion of charge (S122: YES), charging processes are completed. On the other hand, in case the current exceeds the specified value (S122: NO), it is further judged whether the specified temperature gradient can be maintained by adjusting the current value, that is, whether no overshoot has occurred (S124). In case overshoot has occurred (S124: NO), the charging processes are completed. On the other hand, in case no overshoot has occurred (S124: YES), it is judged whether the battery temperature has reached a temperature (55° C.) which is the temperature at the time of completion of charge (target temperature value to be reached ° C. T), namely 57° C., increment by a specified value (x deg: in this case, 2° C.)(S126). In case the battery temperature exceeds the target temperature value to be reached by more than a specified value, charge is already completed (S126: YES) so that processes are terminated. On the other hand, the processes proceeds to Step 128 until the battery temperature exceeds the target temperature value to be reached (S126: NO), and batteries are charged at the current value as defined in Step 120 for further continuing charging processes.

In the battery charging device of the second embodiment, batteries are charged while adjusting the current value such that the temperature rising value becomes a particular temperature rising pattern. Thus, by optimizing the temperature rising pattern as explained above with reference to FIG. 9, it is enabled to perform charge such that the temperature at the time of completion of charge becomes a target temperature value to be reached (lowermost temperature).

In the battery charging device of the illustrated embodiment, a temperature rising pattern is set to be rising in a convex manner, that is, a temperature rising pattern in which the temperature rising value in the former part of charge is set to be relatively high during which the temperature difference between the battery temperature and the peripheral temperature is small, the batteries are hardly cooled, the capacity is almost zero, and the rise in temperature at the time of charge is relatively small, and the temperature rising value in the latter part of charge is set to be relatively low during which the temperature difference between the battery temperature and the peripheral temperature is large, the batteries are easily cooled, and the rise in temperature at the time of charge is relatively large. By setting a temperature rising pattern for optimizing these in a synergistic manner, it is possible to perform charge such that the temperature at the time of completion of charge becomes a lowermost temperature.

The battery charging device according to the second embodiment is further arranged in that charge is terminated when the current value becomes not more than a specified value indicating completion of charge (S122: YES). In case the temperature keeps on rising beyond the specified temperature rising value also by decreasing the current value (S124: NO), an "overshoot" has occurred in which the temperature abruptly rises at the time of completion of charge, so that charge is terminated. Similarly, in case charge is performed while maintaining the temperature rise extend along the temperature rising pattern, and the battery temperature has increased beyond the target temperature value to be reached at the time of completion of charge by not less than a specified value (S126: YES), charge has already been completed so that charge is terminated. In other words, since charge is terminated in the illustrated embodiment by judging completion of charge by the above three types, full charge may be appropriately detected so that 100% charge may be performed without causing excessive charge. It should be noted that completion of charge might be judged also by omitting the judging step(s) of Step 122 and/or Step 124.

Figure 14:
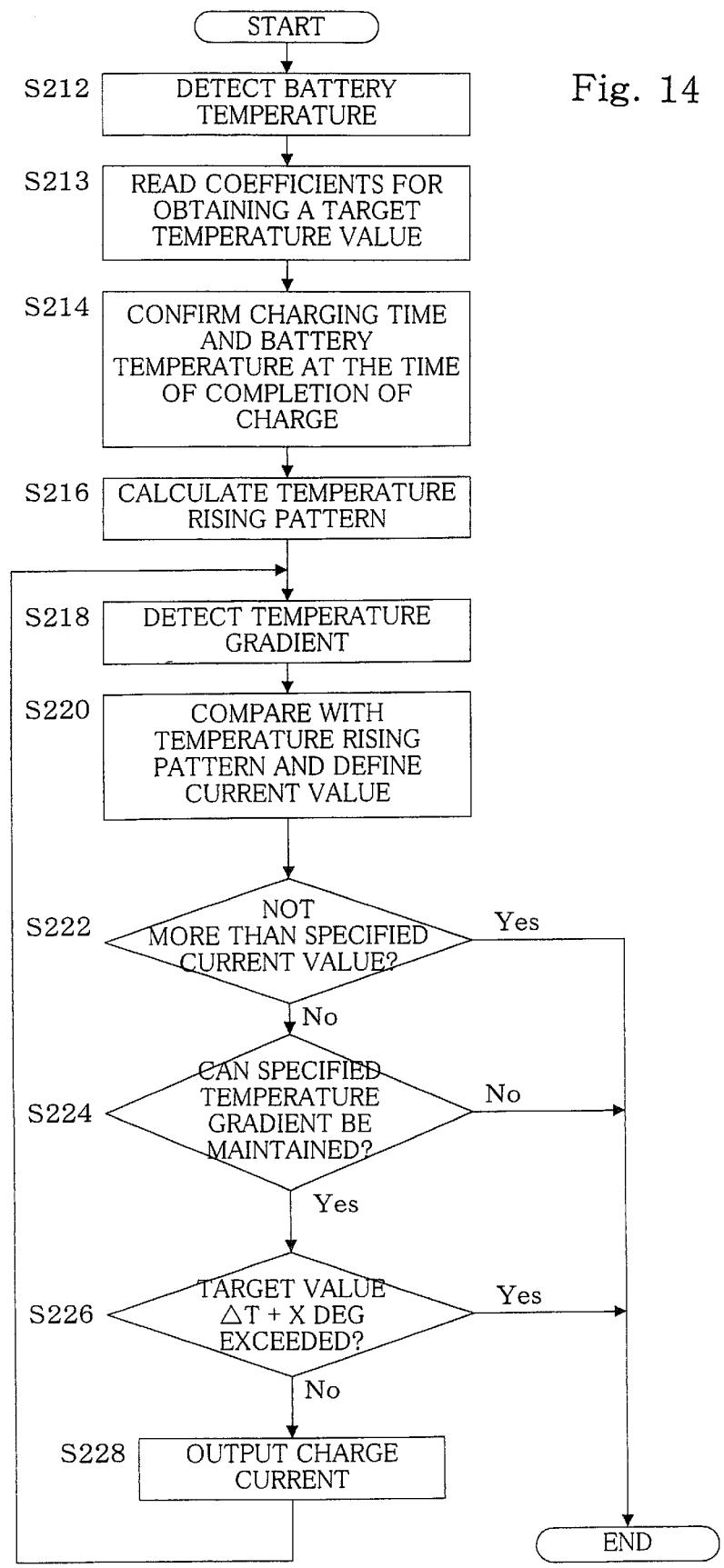
FIG. 14 is a flowchart showing processes performed in a control portion of the battery charging device of the third embodiment.

The charging method according to a third embodiment of the present invention will further be explained with reference to FIGS. 13 to 15.

In the above-described second embodiment, the charging time and final temperature rising value of the batteries as illustrated in FIG. 10 were stored on the battery charging device side. In contrast thereto, borderlines indicating reached temperatures at the time of completion of charge at a lowermost temperature (which have been explained above with reference to FIG. 9) are stored on the battery package side in the third embodiment. More particularly, temperatures reached at the time of completion of charge largely vary depending on the voltage of the battery package (number of cell batteries), types of batteries (characteristics may vary also among nickel-metal hydride batteries) or thermal radiation of the battery package. Thus, by making such values of borderlines (to be referred hereinafter as target temperature to be reached) be stored on the battery package side, it is possible to perform charge of any battery package in a most effective manner.

Arrangements of a battery charging device 210 and battery packages 250A, 250B related to the charging method of the third embodiment will now be explained with reference to FIG. 13. The battery package 250A comprises a ROM 258a for storing values of target temperature value of the battery package to be reached (B1 in FIG. 15). On the other hand, the battery package 250B comprises a ROM 258b for storing values of target temperature value of the battery package to be reached (B2 in FIG. 15). Note that the values of the target temperature to be reached B1, B2 are given by the equation $Y=\beta/(X+\alpha)+\gamma$, and values of the coefficients $\alpha$, $\beta$ and $\gamma$ are respectively written to the ROMs 258a, 258b.

On the other hand, a control circuit 230 of the battery charging device 210 is comprised with a ROM reader 231 for reading the contents of the ROMs 258a, 258b. A memory portion 239 further stores therein an equation for obtaining a temperature rising pattern. Since the remaining arrangements are identical to those of the first embodiment as explained above with reference to FIG. 4, further explanations will be omitted.

Concrete control of charge performed in the charging method of the third embodiment will now be explained with reference to FIG. 14.

A control portion 236 of the battery charging device 210 detects a temperature of the battery package 250A through a temperature detecting portion 238 (S212). Here, it is assumed that the temperature was 20° C. Thereafter, coefficients ($\alpha$, $\beta$ and $\gamma$ for obtaining a target temperature value to be reached B1 are read from the ROM 258a of the battery package 250A, and a curve of the target temperature value to be reached B1 as illustrated in FIG. 15 is calculated (S213). Then, battery temperatures at the time of charge and at the time of completion of charge are confirmed (S214). The illustrated battery charging device 210 is arranged to be switchable between rapid charge and ordinary charge, wherein in the rapid charge, a temperature rising value of the batteries of up to 30 deg are allowed while charge is completed at a value of not more than 25 deg in the ordinary charge. When ordinary charge is being selected, a charging time of 25 minutes is confirmed based on the temperature rising value of the batteries of 25 deg at the time of completion of charge, and in case rapid charge is set, a charging time of 20 minutes is confirmed. Thereafter, a temperature gradient pattern is calculated (S216). When 20 minutes is confirmed for the rapid charge, a convex rising curve (temperature rising pattern) j is calculated based on the equation within the memory portion 239 and by using the line i connecting the 0 deg point and 30 deg point in FIG. 15. It should be noted that while the temperature rising pattern has been calculated based on the equation in the third embodiment, it is alternatively possible to store a plurality of patterns for obtaining one pattern by considering correlations with these patterns.

The control portion 236 obtains the temperature rising value from a difference between the previous temperature value as input from the temperature detecting portion and the currently input temperature value (S218), and the detected temperature rising value is compared with the gradient as calculated in Step 216 for defining a current value (S220). In case the temperature rising value is lower than the temperature rising pattern gradient, the current value is further increased from the current value, and vice versa, if it is higher, the current value is decreased.

It is then judged whether the current value is not more than a specified value (S222). Similarly to the first embodiment, in case the current value is not more than a specified value upon completion of charge (S222: YES), charging processes are completed. On the other hand, in case the current exceeds the specified value (S222: NO), it is further judged whether the specified temperature gradient can be maintained by adjusting the current value, that is, whether no overshoot has occurred (S224). In case overshoot has occurred (S224: NO), the charging processes are completed. On the other hand, in case no overshoot has occurred (S224: YES), it is judged whether the battery temperature has reached a temperature which is the temperature at the time of completion of charge (target temperature value to be reached ° C. T) increment by a specified value (x deg)(S226). In case the battery temperature exceeds the target temperature value to be reached by more than a specified value, charge is already completed (S226: YES) so that processes are terminated. On the other hand, the processes proceeds to Step 228 until the battery temperature exceeds the target temperature value to be reached (S226: NO), and batteries are charged at the current value as defined in Step 220 for further continuing charging processes.

In the charging method of the third embodiment, the target temperature values to be reached B1, B2 are respectively stored on the battery packages 250A, 250B side, whereby it is enabled to complete charge within a shortest time of 20 minutes for the battery package 250A and within a shortest time of 17 minutes (see FIG. 15) for the battery package 250B with the target temperature value to be reached B2 in the above-described manner. It is further possible to perform charge such that the temperature at the time of completion of charge becomes the target temperature value to be reached (lowermost temperature) in various battery charging devices, either a battery charging device capable of performing rapid charge in 20 minutes or a battery charging device capable of performing charge in 1 hour.

The battery charging device according to the third embodiment is further arranged in that charge is terminated when the current value becomes not more than a specified value indicating completion of charge (S222: YES), when the temperature keeps on rising beyond the specified temperature rising value also by decreasing the current value (S224: NO), or when the battery temperature has increased beyond the target temperature value to be reached at the time of completion of charge by not less than a specified value (S226: YES) since charge has already been completed so that charge is terminated. With this arrangement, full charge may be appropriately detected so that 100% charge may be performed without causing excessive charge. In other words, since charge is terminated in the first embodiment by judging completion of charge by the above three types, full charge may be appropriately detected. It should be noted that completion of charge might be judged also by omitting the judging step(s) of Step 222 and/or Step 224.

In the charging method of the third embodiment, charge is performed based on data stored on the battery package side, so that changes in model or new design of battery packages can be easily performed and optimal control of charge may be performed based on newest data also with old types of battery charging devices.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A battery charging device comprising:
   a temperature detecting portion for detecting a present temperature of batteries,
   a temperature rising value outputting portion for obtaining a temperature rising value from the temperature as detected by the temperature detecting portion,
   a current value retrieving portion for retrieving a current value with which the temperature rising value as output from the temperature rising value outputting portion is made constant,
   a charge controlling portion for charging the batteries at the current value that has been retrieved by the current value retrieving portion, and
   a charge terminating portion for terminating charge when at least one of the following conditions are met:
   (a) when the current value has become not more than a specified value indicating completion of charge,
   (b) when the temperature keeps on rising beyond the constant temperature rising value even if the current value is decreased, and
   (c) when a battery temperature has increased beyond a target temperature value to be reached at the time of completion of charge by not less than a specified value.

2. A battery charging device comprising:
   a memory means for storing target temperature values for the batteries to be reached,
   a temperature detecting portion for detecting a present temperature of the batteries,
   a temperature gradient calculating portion for calculating a temperature rising gradient from a charging time based on a difference between a temperature of batteries at the time charge is started and the target temperature value to be reached as stored in the memory means,
   a temperature rising value outputting portion for obtaining a temperature rising value from the temperature as detected by the temperature detecting portion,
   a current value retrieving portion for retrieving a current value with which the temperature rising value as output from the temperature rising value outputting portion becomes the temperature rising gradient,
   a charge controlling portion for charging the batteries at the current value that has been retrieved by the current value retrieving portion, and
   a charge terminating portion for terminating charge when at least one of the following conditions are met:
   (a) when the current value has become not more than a specified value indicating completion of charge,
   (b) when the temperature keeps on rising beyond the constant temperature rising value even if the current value is decreased, and
   (c) when a battery temperature has increased beyond the target temperature value to be reached at the time of completion of charge by not less than a specified value.

3. A battery charging device comprising:
   a memory means for storing target temperature values for the batteries to be reached,
   a temperature detecting portion for detecting a present battery temperature,
   a temperature rising pattern retrieving portion for retrieving a temperature rising pattern for completing charge at the target temperature value to be reached based on a charging time and based on a difference between a temperature of batteries at the time charge is started and the target temperature value to be reached as stored in the memory means
   a temperature rising value outputting portion for obtaining a temperature rising value from the temperature as detected by the temperature detecting portion,
   a current value retrieving portion for retrieving a current value with which the temperature rising value as output from the temperature rising value outputting portion becomes the temperature rising pattern,
   a charge controlling portion for charging the batteries at the current value that has been retrieved by the current value retrieving portion, and
   a charge terminating portion for terminating charge when at least one of the following conditions are met:
   (a) when the current value has become not more than a specified value indicating completion of charge, (b) when the temperature keeps on rising beyond the constant temperature rising value even if the current value is decreased, and (c) when a battery temperature has increased beyond a target temperature value to be reached at the time of completion of charge by not less than a specified value.

4. A battery charging method for storing information related to target temperature values to be reached corresponding to charging time on a battery side and according as the target temperature valves to be reached for performing charge in a battery charging device, the battery charging device comprising:

a memory means for storing a temperature rising pattern for completing charge at a target temperature value as read from the battery side, a temperature detecting portion for detecting a present temperature of the batteries, a temperature rising pattern retrieving portion for retrieving a temperature rising pattern from the memory means based on a temperature of batteries at the time charge is started and charging time, a temperature rising value outputting portion for obtaining a temperature rising value from the temperature as detected by the temperature detecting portion, a current value retrieving portion for retrieving a current value with which the temperature rising value as output from the temperature rising value outputting portion becomes the temperature rising pattern, a charge controlling portion for charging the batteries at the current value that has been retrieved by the current value retrieving portion, and a charge terminating portion for terminating charge when at least one of the following conditions are met:

(a) when the current value has become not more than a specified value indicating completion of charge, (b) when the temperature keeps on rising beyond the constant temperature rising value even if the current value is decreased, and (c) when a battery temperature has increased beyond a target temperature value to be reached at the time of completion of charge by not less than a specified value.

* * * * *